United States Patent
Rivera

(10) Patent No.: US 10,426,289 B2
(45) Date of Patent: Oct. 1, 2019

(54) BREWING MATERIAL HOLDER WITH A TOP WATER SPRAY

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 265 days.

(21) Appl. No.: 15/367,013

(22) Filed: Dec. 1, 2016

(65) Prior Publication Data

US 2017/0231420 A1    Aug. 17, 2017

Related U.S. Application Data

(60) Provisional application No. 62/261,423, filed on Dec. 1, 2015.

(51) Int. Cl.
*A47J 31/00*    (2006.01)
*A47J 31/06*    (2006.01)
*A47J 31/44*    (2006.01)
*A47J 31/36*    (2006.01)

(52) U.S. Cl.
CPC ....... *A47J 31/0631* (2013.01); *A47J 31/4478* (2013.01); *A47J 31/368* (2013.01)

(58) Field of Classification Search
CPC ............... A47J 31/0631; A47J 31/0689; A47J 31/3671; A47J 31/368; A47J 31/4478
USPC .......................... 99/323, 315, 302 R
See application file for complete search history.

(56) References Cited

U.S. PATENT DOCUMENTS

| | | | | |
|---|---|---|---|---|
| 6,658,989 | B2* | 12/2003 | Sweeney | A47J 31/0642 99/306 |
| 8,443,717 | B2* | 5/2013 | Venturi | B65D 85/8043 99/295 |
| 8,561,524 | B2* | 10/2013 | DeMiglio | A47J 31/0689 210/232 |
| 2013/0017303 | A1* | 1/2013 | Vu | A47J 31/0689 426/433 |

* cited by examiner

*Primary Examiner* — Reginald Alexander
(74) *Attorney, Agent, or Firm* — IP Strategies

(57) ABSTRACT

A brewing material holder includes a closed bottom water dispersing member including ports providing streams of water from just under a holder lid bottom, for uniformly dispersing water into the brewing material in the holder. When water is injected into the holder, the flow of water is captured in the water dispersion member and directed up to the ports and sprayed horizontally or vertically into the brewing material, and sinks into brewing material contained in the brewing chamber. The water dispersion member may be attached to the holder lid or be part of the holder lid. A single centered port may be provided in the bottom of the dispensing member provides an additional spray and also helps drain the dispensing member after use.

2 Claims, 5 Drawing Sheets

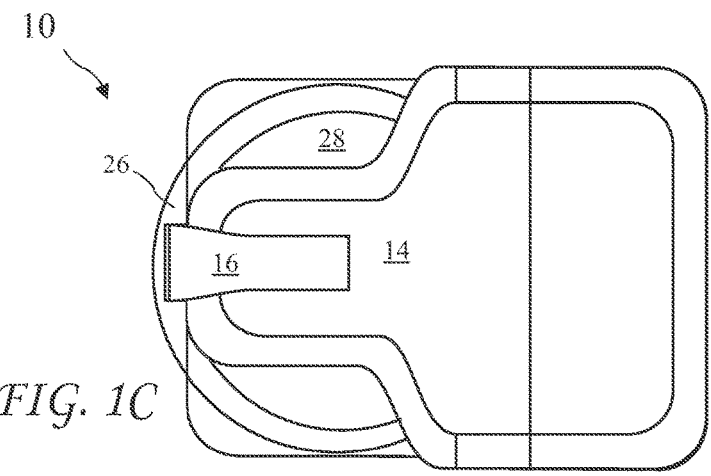
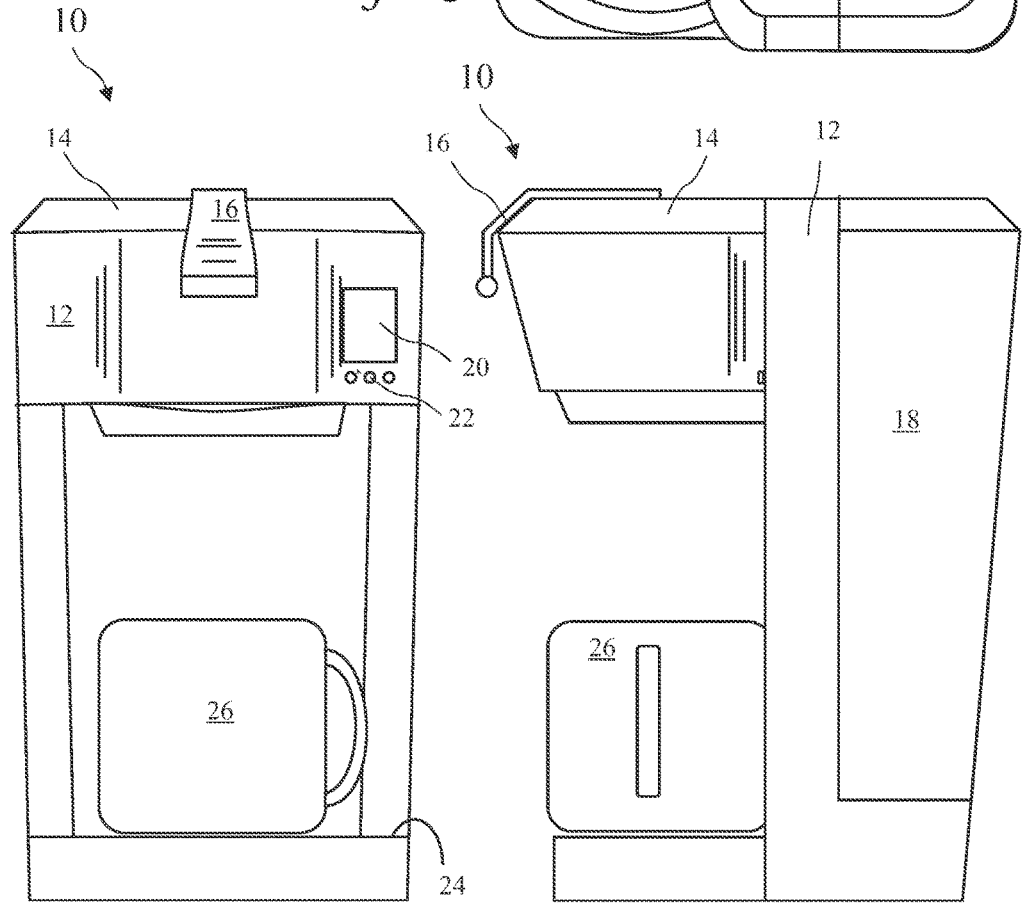
FIG. 1C
FIG. 1A
FIG. 1B

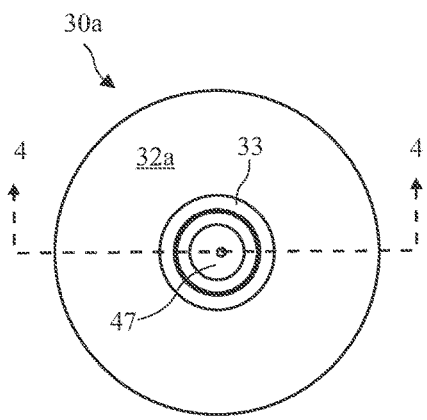
FIG. 3A
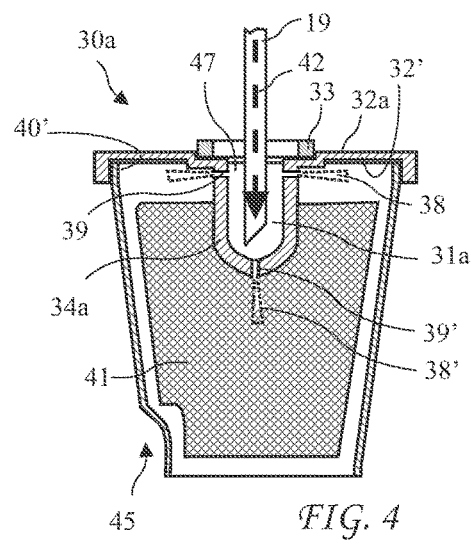
FIG. 4
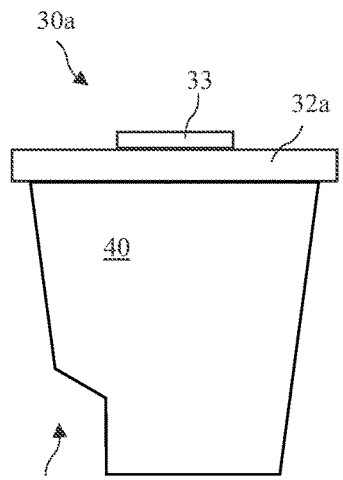
FIG. 3B
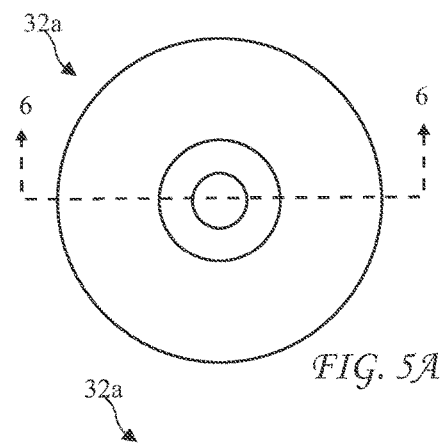
FIG. 5A
FIG. 6
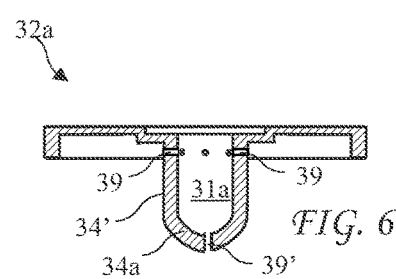
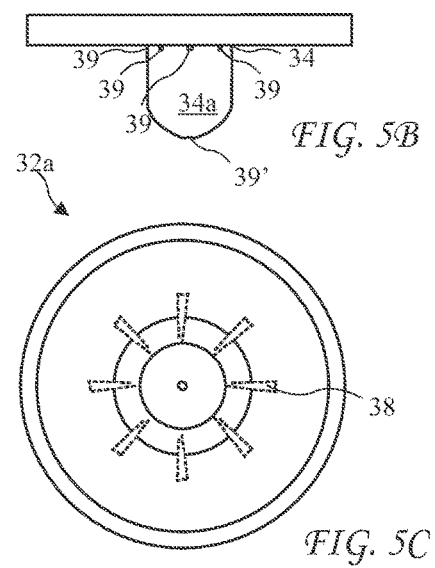
FIG. 5B
FIG. 5C

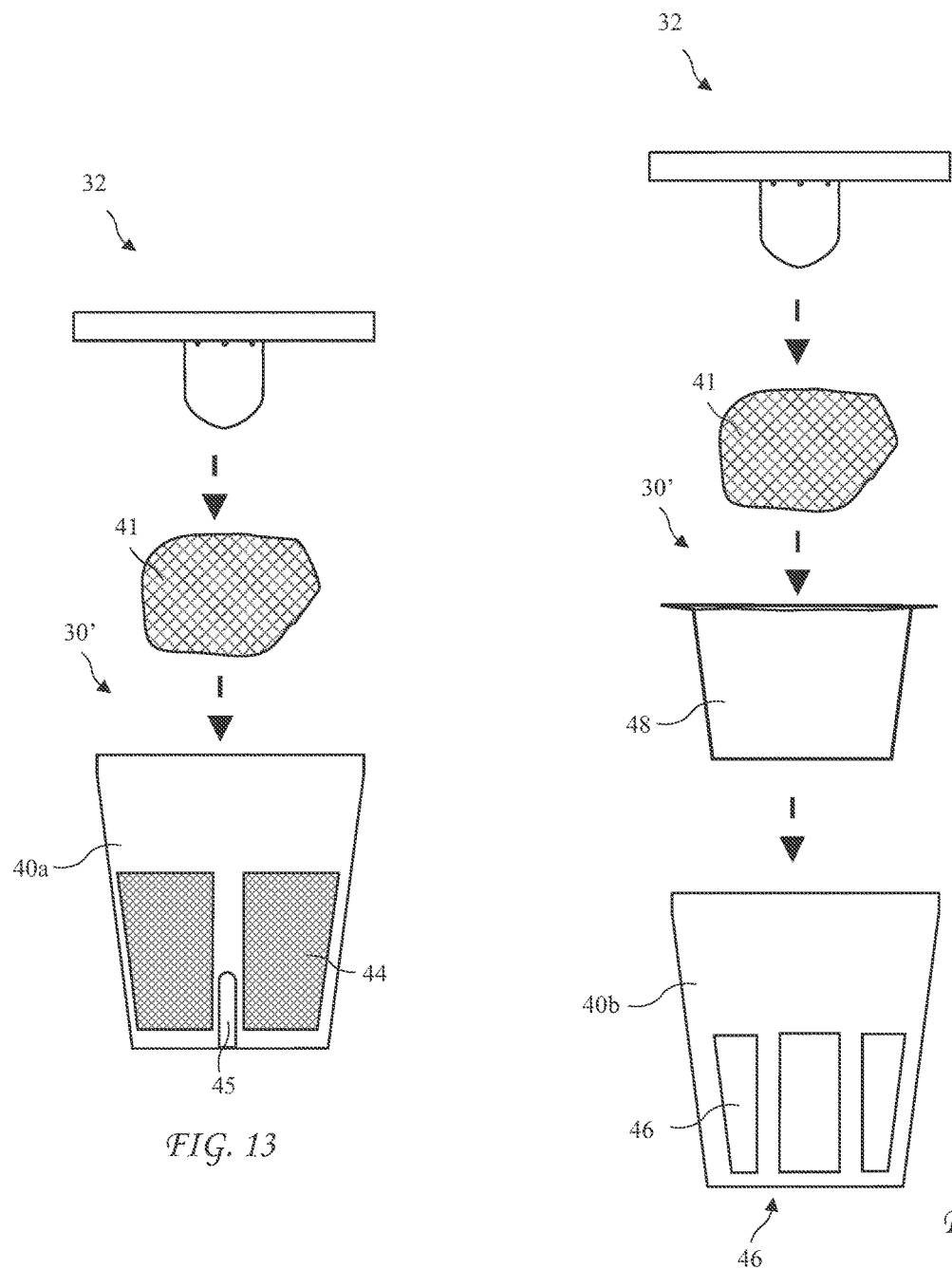

BREWING MATERIAL HOLDER WITH A TOP WATER SPRAY

CROSS-REFERENCE TO RELATED APPLICATIONS

The present application claims the priority of U.S. Provisional Patent Application Ser. No. 62/261,423 filed Dec. 1, 2016, which application is incorporated in its entirety herein by reference.

BACKGROUND OF THE INVENTION

The present invention relates to beverage brewing and in particular to a rotating water dispersion into a brewing chamber.

Brewed beverages are often prepared by injecting water into a brewing chamber containing a brewing material such as ground coffee beans. Various configurations are known including inserting a needle into the brewing material, streams of water injected down towards the brewing material, and water injected into a dispersing member with ports in the bottom to release water into the brewing material. Unfortunately, water released or sprayed into the brewing material seeps downward through the brewing material, and any brewing material above the injection point of the streams is not exposed uniformly to the water.

BRIEF SUMMARY OF THE INVENTION

The present invention addresses the above and other needs by providing a brewing material holder including a closed bottom water dispersing member including ports providing streams of water from just under a holder lid bottom, for uniformly dispersing water into the brewing material in the holder. When water is injected into the holder, the flow of water is captured in the water dispersion member and directed up to the ports and sprayed horizontally or vertically into the brewing material, and sinks into brewing material contained in the brewing chamber. The water dispersion member may be attached to the holder lid or be part of the holder lid. A single centered port may be provided in the bottom of the dispensing member provides an additional spray and also helps drain the dispensing member after use.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3A is a top view of a first brewing material holder including water dispersion according to the present invention.

FIG. 3B is a side view of the first brewing material holder including the water dispersion according to the present invention.

FIG. 4 is a cross-sectional view of the first brewing material holder including the water dispersion according to the present invention taken along line 4-4 of FIG. 3A.

FIG. 5A is a top view of a first brewing material holder lid providing water dispersion according to the present invention.

FIG. 5B is a side view of the first brewing material holder lid providing water dispersion according to the present invention.

FIG. 5C is a bottom view of the first brewing material holder lid providing water dispersion according to the present invention.

FIG. 6 is a cross-sectional view of the first brewing material holder lid providing water dispersion according to the present invention taken along line 6-6 of FIG. 5A.

FIG. 13 shows an exploded view of a holder with mesh material in walls of the base to retain brewing material.

FIG. 14 shows an exploded view of a holder with a filter paper cup inserted into the base to retain brewing material.

Corresponding reference characters indicate corresponding components throughout the several views of the drawings.

DETAILED DESCRIPTION OF THE INVENTION

Figure 2A:
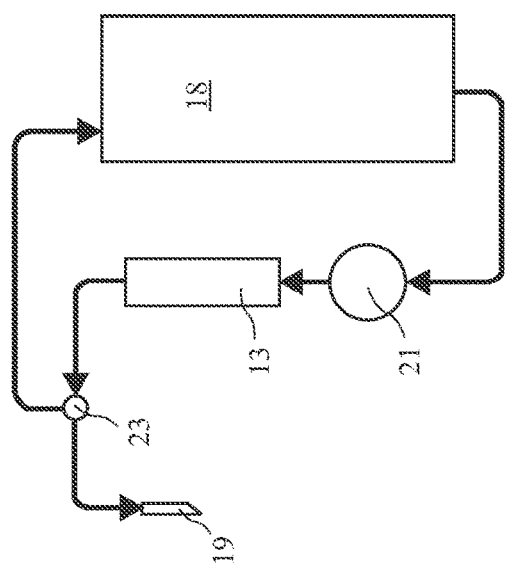
FIG. 2A is a functional diagram of the coffee maker.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" or "approximately" are associated with an element of the invention, it is intended to describe a feature's appearance to the human eye or human perception, and not a precise measurement.

A front view of a coffee maker 10 according to the present invention is shown in FIG. 1A a side view of the coffee maker 10 is shown in FIG. 1B, and a top view of the coffee maker 10 is shown in FIG. 1C. The coffee maker 10 includes a base 12, an opening lid 14, a lid handle 16, a water container 18, a display 20, controls 22, and platform 24. A cup 26 rests on the platform 24. The coffee maker 10 provides a flow of hot water through brewing material to produce a brewed drink. The flow of water may be heated by one of any known means, for example, an electrical heating coil, inductive heating, or a conductive coating on tubing carrying the water.

Figure 2:
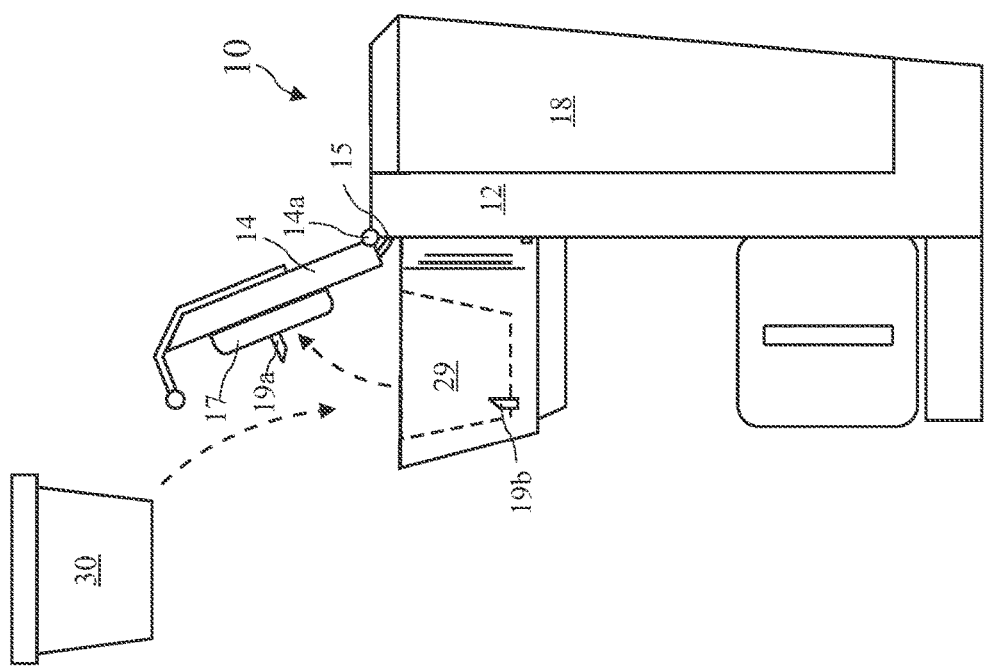
FIG. 2 is a side view of the coffee maker with an open lid allowing placement of a brewing material holder according to the present invention inside the coffee maker.

A side view of the coffee maker 10 with an open lid 14 allowing placement of a brewing material holder 30 according to the present invention inside a brewing chamber 29 of the coffee maker 10 is shown in FIG. 2. The lid 14 includes a lid hinge 14a and a water tube 15 carries heated water into the lid 14. A pad 17 resides on a bottom surface of the lid 14 and presses against the brewing material holder 30 when the lid 14 is closed, and in cooperation with other means, tamps coffee contained in the brewing material holder 30. A nozzle (or injection needle) 19a extending down from the closed lid 14 directs the flow of hot water into the brewing material holder 30. A bottom puncture needle 19b extends up into the brewing chamber 29 to puncture single use brewing cartridges.

A functional diagram of the coffee maker 10 is shown in FIG. 2A. The preferred coffee (or brewing material) maker 10 includes the water tank 18, water pump 21, a heater 13, check valve 23 and the nozzle 18. The pump 21 preferably provides at least one PSI water pressure. The water heater 13 may include a heating coil, inductive heating, or a resistive coating or any other means for heating water. The check valve 23 limits the water pressure at the nozzle 19a by returning some of the water flow to the water tank 18. While the water pump 21 is a preferred method for providing a flow of water to the nozzle 19a, other methods include placing the water in the water tank 18 under pressure, and a coffee maker using any means to provide a forced flow of water is intending to come within the scope of the present invention.

A top view of a brewing material holder 30a including water dispersion according to the present invention is shown in FIG. 3A and a side view of the brewing material holder 30a is shown in FIG. 3B. The brewing material holder 30a includes a removable lid 32a and a base 40. A seal 33 rests on the lid 32a to seal to the coffee maker 10 (see FIG. 2). A flow of water 42 is provided, preferably under pressure, through the nozzle (or injection needle) 19a into the brewing material holder 30a. The holder 30a may be configured to allow use in coffee makers sold under the trademark KEURIG which include a top puncture injection needle 19a for puncturing and injecting pressurized water into a pre-packaged, single use, brewing cartridge, and a bottom puncture needle for puncturing the pre-packaged, single use, brewing cartridge to extract brewed beverage. Such coffee makers are described in U.S. Pat. No. 5,325,765, incorporated herein by reference in its entirety.

The pressurized flow of water 42 enters the brewing material holder 30a through a passage 47 in the lid 32a. The passage 47 is preferably configured to accept the top puncture needle of the '765 patent. The base 40 may further include a bottom recess 45 to avoid the bottom needle disclosed in the '765 patent. The recess 45 may be into the side of the holder, or into the bottom of the holder base 40. In other embodiments, an injection needle or an extraction needle may penetrate the cartridge from a side versus the top or bottom.

A cross-sectional view of the brewing material holder 30a including a water dispersion member 34a, taken along line 4-4 of FIG. 3A, is shown in FIG. 4. The water dispersion member 34a is a portion of the lid 32a or fixed to the lid 32a, capturing the flow of water 42 in an injection needle chamber 31a. As the water dispersion member 34a fills, the water level rises and reaches ports 39 just under a bottom surface 32' of the lid 32a, producing radial, generally horizontal sprays of water 38 towards an outer top edge 40' of the base 40.

A top view of the lid 32a including the water dispersion member 34a is shown in FIG. 5A, a side view of the lid 32a is shown in FIG. 5B, a bottom view of the lid 32a is shown in FIG. 5C, and a cross-sectional view of the lid 32a taken along line 6-6 of FIG. 5A is shown in FIG. 6. The water dispersion member 34a includes the injection needle chamber 31a and eight evenly angularly spaced apart, radially aligned ports 39, providing eight evenly angularly spaced apart, radially directed sprays 38. In other embodiments the dispersion member may include between 2 and 16 ports.

Figure 7:
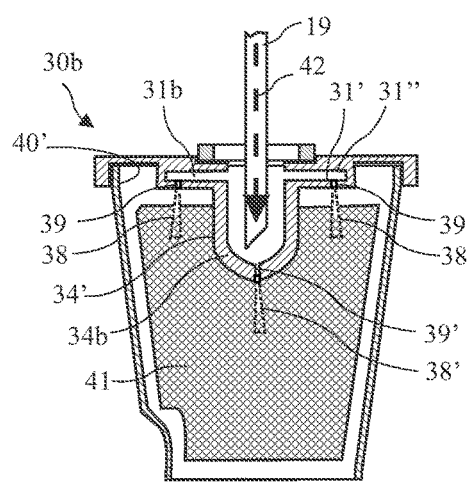
FIG. 7 is a cross-sectional view of a second brewing material holder including a second water dispersion member according to the present invention taken along line 4-4 of FIG. 3A.
Figure 8:
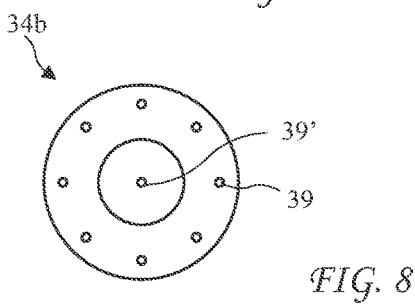
FIG. 8 is a bottom view of the second water dispersion member according to the present invention.

A cross-sectional view of a second brewing material holder 30b including a second water dispersion member 34b taken along line 4-4 of FIG. 3A is shown in FIG. 7 and a bottom view of the second water dispersion member 34b is shown in FIG. 8. The second water dispersion member 34b includes a circular chamber 31b including a circle of ports 39 in a floor 31' and aimed downward from a bottom surface of the circular chamber 31b of the second water dispersion member 34b, and may include a centered port 39' in the bottom of the second water dispersion member 34b. The ports 39 are preferably radially approximately centered between an outer edge 34' of the second water dispersion member 34b and the outer top edge of the base 40'. The circular chamber 31b is disk shaped preferably having a round perimeter and generally flat floor 31' and flat ceiling 31", and circular wall 31'''. The ceiling 31" preferably a bottom surface of the lid 32. While eight ports 39 are shown, the number of ports preferably varies between 4 and 16 ports.

Figure 9:
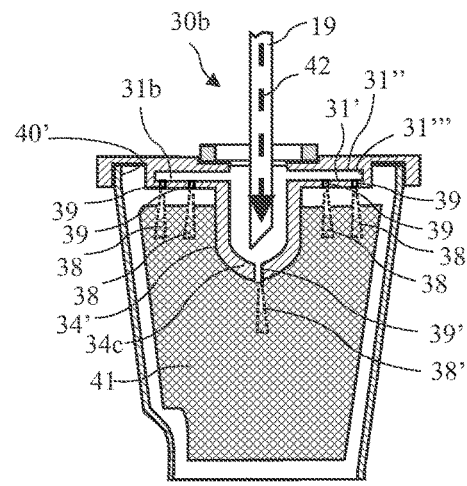
FIG. 9 is a cross-sectional view of a third brewing material holder including a third water dispersion member according to the present invention taken along line 4-4 of FIG. 3A.
Figure 10:
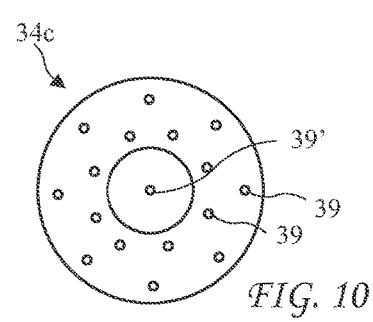
FIG. 10 is a bottom view of the third water dispersion member according to the present invention.

A cross-sectional view of a third brewing material holder 30c including a third water dispersion member 34c taken along line 4-4 of FIG. 3A is shown in FIG. 9 and a bottom view of the third water dispersion member 34c is shown in FIG. 10. The third water dispersion member 34c includes inner and outer circles of ports 39 aimed downward from a bottom surface of the third water dispersion member 34c, and may include a centered port 39' in the bottom of the third water dispersion member 34c. The two circles of ports 39 are preferably radially spaced about ⅓ and ⅔ of the distance between the outer edge 34' of the water dispersion member 34c and the outer top rim of the base 40', from the outer edge 34' of the water dispersion member 34c. While 16 ports 39 are shown, the number of ports preferably varies between 8 and 24 ports, and the number of outer ports may be greater than the number of inner ports.

Figure 11:
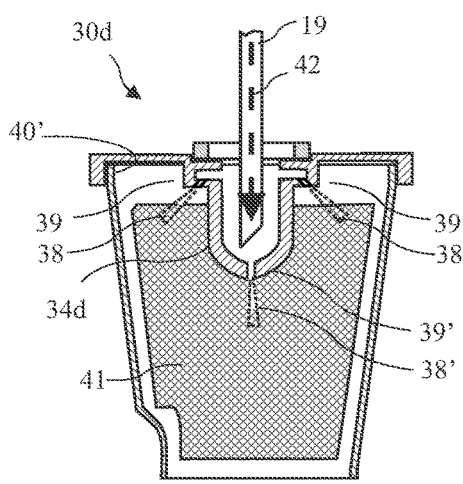
FIG. 11 is a cross-sectional view of a third brewing material holder including a third water dispersion member according to the present invention taken along line 4-4 of FIG. 3A.
Figure 12:
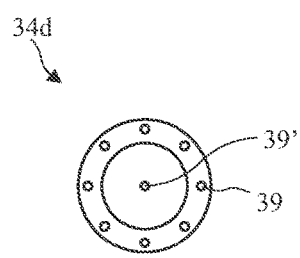
FIG. 12 is a bottom view of the third water dispersion member according to the present invention.

A cross-sectional view of a fourth brewing material holder 30d including a fourth water dispersion member 34d taken along line 4-4 of FIG. 3A is shown in FIG. 11 and a bottom view of the fourth water dispersion member 34d is shown in FIG. 12. The fourth water dispersion member 34d includes a circle of ports 39 aimed downward and outward from a bottom surface of the fourth water dispersion member 34d, and may include a centered port 39' in the bottom of the fourth water dispersion 34d.

An exploded view of a holder with mesh material 44 in walls of a base 40a to retain brewing material 41 is shown in FIG. 13 and an exploded view of a holder with a filter paper cup 48 inserted into the base 40b to retain brewing material 41 is shown in FIG. 14. Openings 46 are provided in the walls and/or bottom of the base 40b to allow the brewed drink to escape. The lids and water dispersion members described above may be used with either holder base 40a and 40b.

While the invention herein disclosed has been described by means of specific embodiments and applications thereof, numerous modifications and variations could be made thereto by those skilled in the art without departing from the scope of the invention set forth in the claims.

I claim:

1. A brewing material holder, comprising:
 a base having an interior configured to hold brewing material, wherein the base is configured to be placed in a brewing chamber of a coffee maker and includes a recess configured to avoid a bottom puncture needle extending from a bottom of the brewing chamber; and
 a removable lid attachable to and detachable from the base, wherein the lid includes:
  a water inlet configured to receive an injection needle in fluid communication with a pressurized water supply of the coffee maker; and
  a water-dispersing member including:
   an injection needle chamber configured to provide space for the injection needle and limiting a release of water from the injection needle to directed sprays of water into the interior of the base;
   a central vertical port in the injection needle chamber configured to provide a corresponding one of the directed sprays;
   a disk-shaped circular chamber arranged in fluid communication with the injection needle chamber and disposed on a bottom surface of the lid, extending radially from the injection needle chamber above the interior of the base; and
   a plurality of angularly spaced-apart second ports arranged in a floor of the circular chamber, spaced radially outward from the injection needle chamber about half the distance from an outer wall of the injection needle chamber to an outer rim of the circular chamber, and configured to provide a corresponding plurality of vertically downward directed sprays into the interior of the base.

2. A brewing material holder, comprising:
 a base having an interior configured to hold brewing material, wherein the base is configured to be placed in a brewing chamber of a coffee maker and includes a recess configured to avoid a bottom puncture needle extending from a bottom of the brewing chamber; and
 a removable lid attachable to and detachable from the base, wherein the lid includes:
  a water inlet configured to receive an injection needle in fluid communication with a pressurized water supply of the coffee maker; and
  a water-dispersing member including:
   an injection needle chamber configured to provide space for the injection needle and limiting a release of water from the injection needle to directed sprays of water into the interior of the base;
   a central vertical port in the injection needle chamber configured to provide a corresponding one of the directed sprays;
   a disk-shaped circular chamber arranged in fluid communication with the injection needle chamber and disposed on a bottom surface of the lid, extending radially from the injection needle chamber above the interior of the base; and
   a plurality of second ports, radially spaced in two circles arranged about $1/3$ and $2/3$ of the distance between an outer edge of the injection needle chamber and an outer rim of the circular chamber, and configured to provide a corresponding plurality of vertically downward directed sprays into the interior of the base.

* * * * *